United States Patent [19]
Fluder et al.

[11] Patent Number: 5,253,292
[45] Date of Patent: Oct. 12, 1993

[54] PORTABLE RADIOTELEPHONE SUPPORT ASSEMBLY

[75] Inventors: Ernest R. Fluder, Hoffman Estates; Terrence E. Derdzinski, Fox River Grove, both of Ill.

[73] Assignee: Motorola, Inc., Schaumburg, Ill.

[21] Appl. No.: 751,450

[22] Filed: Aug. 28, 1991

[51] Int. Cl.$^5$ ............................................. H04M 1/00
[52] U.S. Cl. .................................... 379/426; 379/446; 379/454; 379/455
[58] Field of Search ................. 379/58, 435, 446, 447, 379/449, 426, 454, 455; 455/59, 90, 128; 361/422

[56] References Cited

U.S. PATENT DOCUMENTS

| | | | |
|---|---|---|---|
| 3,141,072 | 7/1964 | Neilson | 379/449 |
| 3,582,574 | 6/1971 | Gra | 379/449 |
| 4,588,866 | 5/1986 | Monti | 379/435 |
| 4,797,916 | 1/1989 | Kojima | 379/435 |
| 4,878,237 | 10/1989 | Cianfione | 379/446 |

FOREIGN PATENT DOCUMENTS

| | | | |
|---|---|---|---|
| 3413239 | 10/1985 | Fed. Rep. of Germany | 379/455 |
| 298759 | 1/1989 | Fed. Rep. of Germany | 455/89 |
| 85949 | 4/1991 | Japan | 379/455 |

Primary Examiner—James L. Dwyer
Assistant Examiner—Jack Chiang
Attorney, Agent, or Firm—Robert H. Kelly

[57] ABSTRACT

A carrier assembly for an electronic device, such as a radiotelephone. The carrier assembly is comprised of a frame and a support arm pivotally coupled thereto. The frame receives the electronic device to engage supportively the electronic device thereat, and latch members latch the electronic device to the frame. The support arm is pivotally coupled to the frame to permit positioning of the support arm to form either a clip or a table-support. When positioned to form a clip, the carrier assembly permits carriage of the electronic device by way of supportive engagement of the device to an external object, such as a belt or other article of clothing, of a user. When positioned at the table-support position, the support arm is operative to support the electronic device in a desired orientation upon a surface.

14 Claims, 6 Drawing Sheets

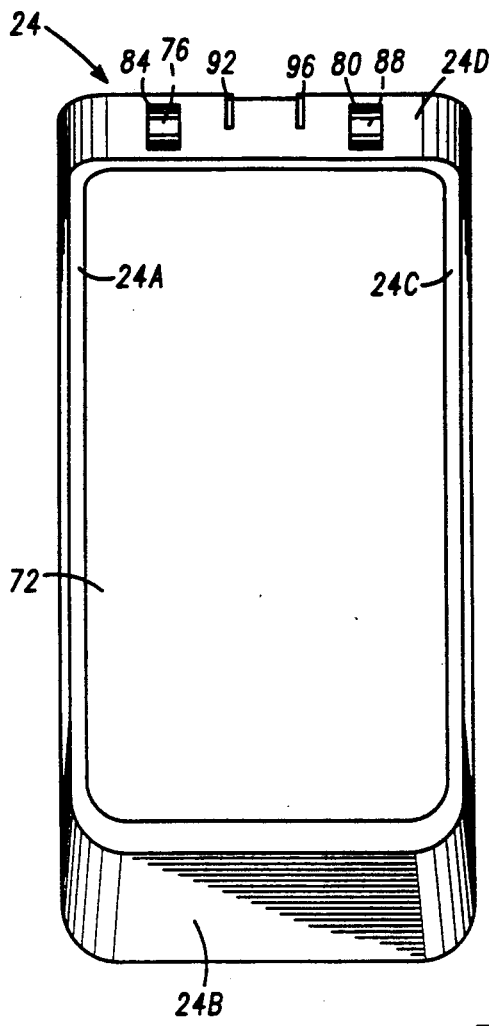
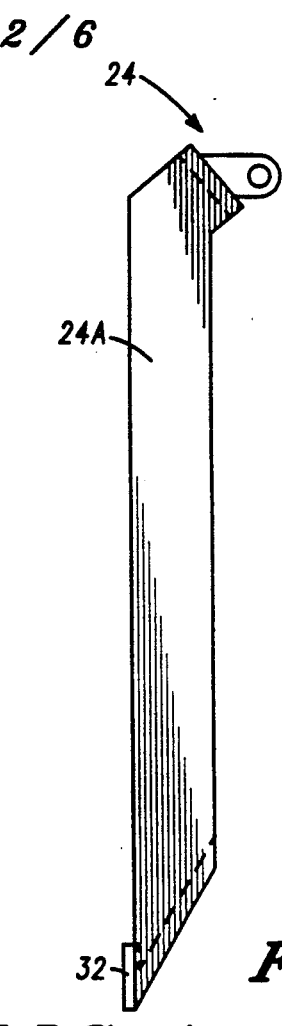
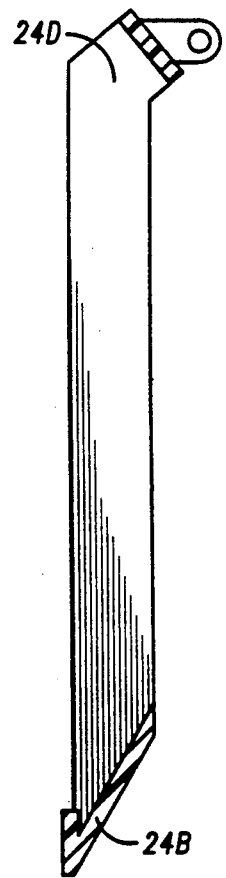
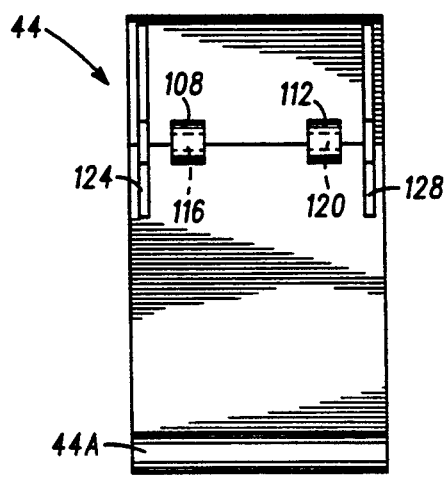
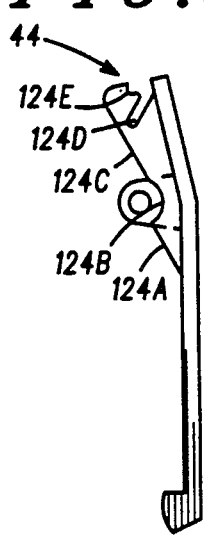
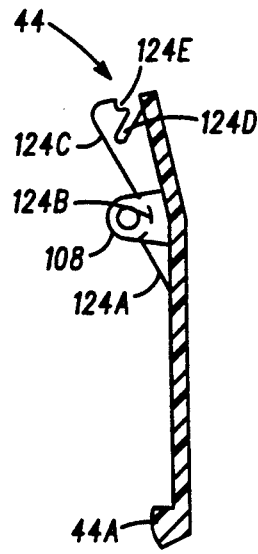
FIG.3  FIG.4  FIG.6B
FIG.7  FIG.8  FIG.9

PORTABLE RADIOTELEPHONE SUPPORT ASSEMBLY

BACKGROUND OF THE INVENTION

The present invention relates generally to support apparatus for electronic devices, and, more particularly, to a support apparatus for supporting a portable transceiver.

Historically, communication upon a telephonic network required a user to make use of a conventional telephone. A conventional telephone is comprised of a telephone base assembly and a telephone handset wherein the base assembly and the handset are interconnected by a telephone cord. The handset contains a speaker and a microphone to permit a user to speak into the telephone, and to hear signals transmitted to the telephone over the telephonic network. The base assembly of such a conventional telephone is coupled to a telephonic outlet to form a fixed connection of the telephone to the conventional telephonic network whereby communication between the telephone and a remote location may be effectuated.

Technological improvements in the field of telephonic communications, however, have permitted the introduction and use of portable telephonic apparatus which greatly increases the portability of such apparatus.

For instance, transceiver constructions, including transceiver constructions frequently referred to as cordless telephones and transceiver constructions frequently referred to as cellular telephones are two examples of products which have been made commercially feasible as a result of such technological improvements.

Both cordless telephones and cellular telephones permit a user to effectuate communication upon a conventional telephonic network.

While a cordless telephone comprises both a telephone base assembly and a telephone handset, a cordless telephone, as its name indicates, does not require a telephone cord to interconnect the handset with the base assembly. Rather, both the handset and the base assembly include transceiver circuitry for transmitting radio frequency signals therebetween. As no cord is required to interconnect the base assembly and the handset of such cordless telephones, the user of a cordless telephone need not be positioned in close proximity to the base assembly to effectuate communications therethrough. To the contrary, the user may carry the handset to any location within the transmission range of the circuitry forming the transceivers of the two portions of such a cordless telephone construction.

The handset of a cordless telephone is little, or no, larger than the size of a telephonic handset of a conventional telephone, and, hence, is of a size permitting carriage by a user.

A cellular telephone (also frequently called a radiotelephone, or, more generically, a transceiver) is operative to communicate upon a cellular, communication system. In a cellular, communication system, numerous fixed-site transceivers, referred to as "base stations" are installed at spaced-apart locations throughout a geographical area. Each of the base stations contains circuitry to receive modulated signals transmitted thereto, and to transmit modulated signals therefrom. A radiotelephone transmits the modulated signals to a base station, and a base station transmits the modulated signals to the radiotelephone. Two-way communication is thereby effectuated between a base station and a radiotelephone. The base stations, in turn, are connected to a conventional, telephonic network.

A cellular telephone positioned at any location within the area encompassed by the cellular, communication system, may be operative both to transmit and to receive radio frequency signals, thereby to effectuate the two-way communication therebetween.

Increased miniaturization of the circuitry forming a cellular telephone has permitted a cellular telephone to be of a size permitting carriage thereof by a user.

As the dimensions of both the transceiver comprising a cordless telephone and the transceiver comprising a portable, cellular telephone permit carriage thereof by a user, either of the respective transceivers may be carried by the user to permit the placement, and the reception, of telephone calls. However, as a user moves about, the transceiver must be repeatedly picked up and repositioned by the user. If the user is wearing clothing having oversized pockets, the user may be able to carry the transceiver within such oversized pockets. Carriage of the transceiver by the user as the user moves to different locations is thereby automatic.

More frequently, however, the user does not wear clothing having such oversized pockets. In such instances, the transceiver, must be, as just mentioned, repeatedly picked up and repositioned each time in which the user changes location to maintain the transceiver in close proximity to the user. As such repeated repositioning of the transceiver is inconvenient, or the user may forget to reposition the transceiver as the user changes location, means by which the user could affix the transceiver to an article of clothing to ensure that the transceiver would be carried by the user as the user changes location would be beneficial.

For instance, U.S. patent application, Ser. No. 632,248, entitled "Telephonic Handset Housing Assembly For Cordless Telephone", filed on Jul. 26, 1991, by Kenneth Carlson and Steven Emmert discloses a chip assembly for a cordless telephone. The chip assembly permits affixation of the handset of the cordless telephone to an article of clothing, such as a belt, of a user to permit automatic carriage by the user thereby.

In addition to a telephonic keypad, portable radiotelephones additionally typically include visual indicia, such as liquid crystal displays or light emitting diodes, disposed upon face surfaces of the housing of such radiotelephones. As the visual clarity of the information displayed by such visual indicia is dependent, at least in part, by the angle, relative to the visual indicia, at which the user is positioned.

In some instances, the user may position the portable radiotelephone upon a flat surface, such as a table-top surface, to permit display of the visual indicia, and, in order to place a telephone call, to actuate a series of keys of a keypad display. As merely positioning the radiotelephone directly upon the flat surface does not necessarily position the radiotelephone in a most-advantageous orientation relative to the user (either to view the visual indicia or to enter information by way of the telephonic keypad), attempts are sometimes made to orient better the radiotelephone relative to the user.

In some instances, a book, or other object, is positioned beneath one side of the radiotelephone to cause the radiotelephone to extend at an angle relative to the surface upon which the radiotelephone is initially placed. As the book, or other object, essentially functions to form an inclined plane, equivalent structure could be affixed to the radiotelephone to ensure that the radiotelephone may be conveniently positioned to extend at an angle relative to a surface upon which a radiotelephone is positioned.

However, as it is desirable to minimize the physical dimensions of the radiotelephone to maximize thereby the portability of the device, it is desirable to minimize the elements of the physical structure of the housing of the radiotelephone.

What is additionally needed, therefore, is support structure operative to permit convenient carriage of the portable radiotelephone by a user, and also, when the radiotelephone is positioned upon a surface (such as a table-top surface), to support the radiotelephone in a desired orientation to maximize ease of use of the radiotelephone when positioned in such an orientation.

SUMMARY OF THE INVENTION

The present invention, accordingly, provides a support structure for a portable electronic device.

The present invention further advantageously provides a telephonic carrier assembly for carrying a portable radiotelephone.

The present invention yet further advantageously provides a support apparatus for a portable radiotelephone having a support arm capable of pivotal movement between a clip position whereat the support arm is operative to function as a clip, and a table-support position whereat the support arm is operative to support the radiotelephone at an angle relative to a flat surface when positioned thereupon.

The present invention includes further advantages and features, the details of which will become evident by reading the detailed description of the preferred embodiments hereinbelow.

In accordance with the present invention, therefore, a support apparatus for a portable electronic device is disclosed. The support apparatus comprises a frame for bracketing the electronic device thereto in supportive engagement thereagainst. The frame formed thereby is affixed to the electronic device. A support arm is pivotally coupled to the frame and capable of pivotal movement between a clip position and a table-support position. A spring generates a bias force for maintaining the support arm normally in the clip position. A stay maintains the support arm at the table-support position subsequent to pivotal movement of the support arm into the table-support position.

BRIEF DESCRIPTION OF THE DRAWINGS

The present invention will be better understood when read in light of the accompanying drawings in which:

FIG. 3 is a bottom view of the frame forming a portion of the carrier assembly of FIG. 1;

FIG. 4 is a side, elevational view of the frame forming a portion of the carrier assembly of FIG. 1;

FIG. 6B is a cross-sectional view taken along line 6B—6B of FIG. 2;

FIG. 7 is an overhead view of a support arm forming a portion of the carrier assembly of FIG. 1;

FIG. 8 is a side, elevational view of the support arm of FIG. 7;

FIG. 9 is a cross-sectional view taken along line 9—9 of FIG. 8;

DESCRIPTION OF THE PREFERRED EMBODIMENTS

Figure 1:
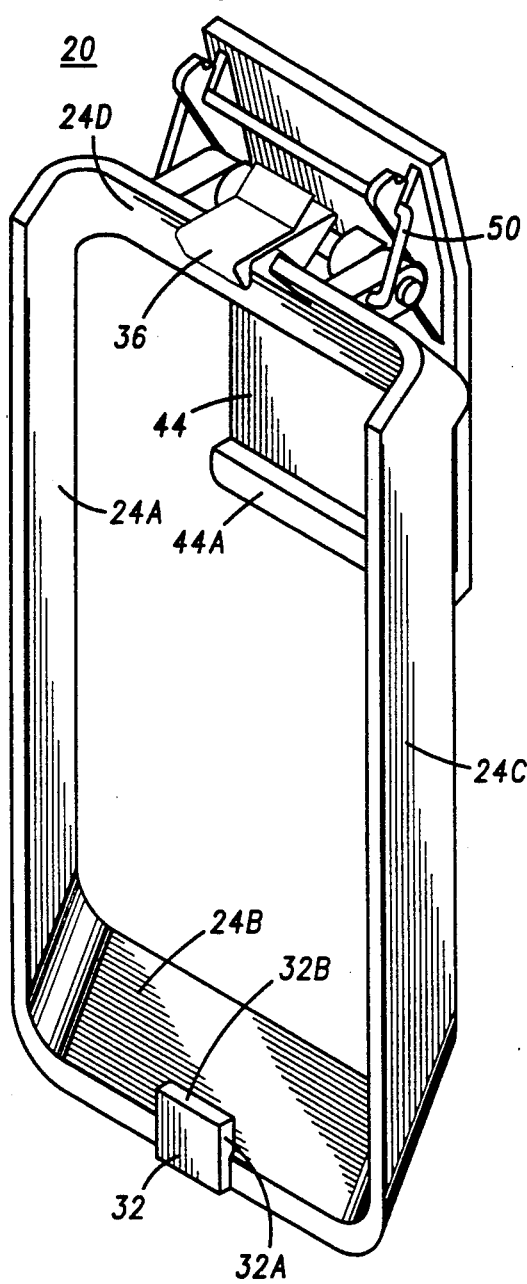
FIG. 1 is a perspective view of the carrier assembly of a preferred embodiment of the present invention.

Referring first to the perspective view of FIG. 1, there is shown the carrier assembly, referred to generally by reference numeral 20, of a preferred embodiment of the present invention. Carrier assembly 20 comprises frame 24. Frame 24, in the preferred embodiment and as shown, is integrally formed of side panels 24A, 24B, 24C, and 24D which are connected theretogether at end portions thereof to form a bracket thereby. Frame 24, in the preferred embodiment, is comprised of a thermoplastic material. Side panels 24A-D are elongated in longitudinal directions thereof, and have side surfaces of greater dimensions than edge surfaces thereof. Edge surfaces of side panels 24A and 24C form top and bottom surfaces of the respective panels. Side panels 24B and 24D are rotated in orientation relative to the orientations of panels 24A and 24C such that side surfaces of panels 24B and 24D form seating surfaces. The side surfaces of side panels 24B and 24D thereby form seating surfaces for seating of an electrical device thereupon.

Latch member 32 is integrally formed with side panel 24B to protrude above a top surface thereof. Latching surfaces 32A and 32B formed upon surfaces of latch 32 permit latching engagement thereat with corresponding latch surfaces formed upon an electronic device when positioned in mated engagement therewith. Affixed to side panel 24D is latch member 36. Latch member 36 is affixed in fixed engagement centrally along the length of panel 24D. A surface of latch member 36 forms latching surface 36A, and is positioned to extend beyond a top surface of side panel 24D. Similar to latch surface 32A and 32B of latch 32, latching surface 36A is operative to engage latchingly with a corresponding latching surface formed upon an electronic device when positioned in mated engagement therewith.

Support arm 44 is pivotally coupled to side panel 24D of frame 24 to permit pivotal movement therearound. The perspective view of FIG. 1 further illustrates raised bottom surface 44A formed at an end portion of support arm 44 which forms a support surface thereby.

Also shown in the perspective view of FIG. 1, is stay 50 formed of a rod member having bent-angled end portions which are connected to frame 24. The end portions of stay 50 are not affixed to frame 24, but, rather, are coupled to the frame in a manner permitting slight pivotal movement therearound. Stay 50 is operative to engage, along the length thereof, with support arm 24, to maintain support arm 44 in a desired orientation relative to frame 24.

Figure 2:
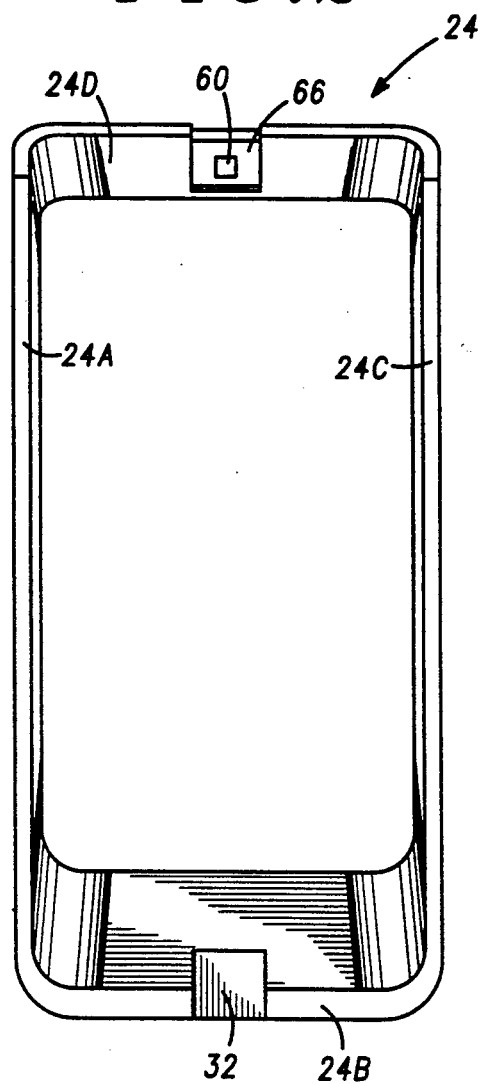
FIG. 2 is an overhead view of a frame forming a portion of the carrier assembly of FIG. 1.

Turning now to FIG. 2, an overhead view of frame 24 of carrier assembly 20 of FIG. 1 is shown in isolation. The overhead view of FIG. 2 shows in greater detail the relationship between side panels 24A-24D and the seating surfaces formed of side surfaces of side panels 24B and 24D to permit seating of an electronic device thereupon. Latch member 32, formed integral with side panel 24B, protrudes beyond a top surface of the side panel. Latch member 36 (previously shown in the perspective view of FIG. 1 affixed in position centrally along the length of side panel 24D) is not shown in the isolational view of FIG. 2, but, rather, shows only raised button 60 centered to protrude beyond a top surface of side panel 24D. Raised button 60 is formed integral with side panel 24D at a center of recessed area 66 formed to extend into the surface of side panel 24D. Raised button 60 and recessed area 66 form a mounting area to affix latch member 36 in fixed engagement thereat, as shown in the perspective view of FIG. 1. As will be noted hereinbelow, latch member 36 includes appropriate structure to permit affixation thereof to the mounting surface formed of recessed area 66 and raised button 60.

The overhead view of FIG. 2 further illustrates a central cavity, commonly referred numeral 72, defined by the area bounded by, and enclosed by, side panels 24A-24D. Perimetral portions of side panels 24A-D forming the inner diameter of frame 24 define a perimeter of dimensions corresponding to, but slightly greater than an outer diameter of an electronic device to be supported by the carrier assembly of which frame 24 forms a portion.

FIG. 3 is a bottom view of frame 24 which forms a portion of carrier assembly 20 shown in the perspective view of FIG. 1. The bottom view of FIG. 3 again illustrates side panels 24A-24D which together form frame 24. Central cavity 72 defined by side panels 24A-24D is also again illustrated in the Figure. The bottom view of FIG. 3 illustrates flanges 76 and 80 which are formed integral with side panel 24D, and which are spaced-apart from one another by a pre-defined distance. Bore 84, shown in hatch, extends through flange 76, and bore 88, also shown in hatch, extends through flange 80.

Spaced-apart, raised tracks 92 and 96 are also formed upon the bottom surface of side panel 24D. Tracks 92 and 96 are spaced-apart by distances corresponding to distances separating opposing sides of recessed area 66 formed upon a top surface of side panel 24D (shown in the overhead view of FIG. 2). Tracks 92 and 96 define a surface portion of the bottom surface of side panel 24 extending between the respective tracks 92 and 96 for receiving a portion of latch member 36 (shown previously in the perspective view of FIG. 1) to maintain the latch member in affixed engagement with side panel 24D of frame 24.

FIG. 4 is a side, elevational view of frame 24. A single side panel, side panel 24A is shown in the view of FIG. 4. Latch member 32, formed to protrude beyond a top surface of side panel 24B of frame 24, is also shown in the side, elevational view of FIG. 4. Further, flange 76, formed integral with side panel 24D and extending therebelow, as well as bore 84 extending therethrough, are also shown in the side, elevational view of FIG. 4.

Figure 5:
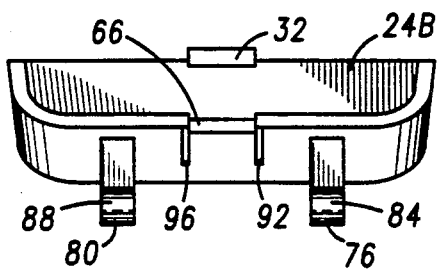
FIG. 5 is an end view of the frame forming a portion of the carrier assembly of FIG. 1 taken from behind a first end thereof.

FIG. 5 is an end view, taken from behind side panel 24D of frame 24. The relationship between flanges 76 and 80 formed integral with, and extending beneath, side panel 24D is illustrated therein. Bores 84 and 88 extending through flanges 76 and 80, respectively, are shown to be aligned with one another. Recessed area 66, formed to extend into a top surface of side panel 24D, and tracks 92 and 96 formed to extend beneath a bottom surface of side panel 24D, are also shown in the end view of FIG. 5. As mentioned previously, recessed area 66 and tracks 92 and 96 together function to receive a portion of latch member 36 (shown in the perspective view of FIG. 1). A portion of side panel 24B of frame 24, and latch member 32 formed to protrude beyond the top surface thereof are additionally shown in the end view of FIG. 5.

Figure 6A:
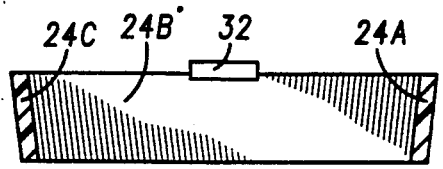
FIG. 6A is a cross-sectional view taken along line 6A—6A of FIG. 2.

FIG. 6A is a cross-sectional view taken along line 6A—6A of FIG. 2. The cross-sectional view of FIG. 6A shows side panels 24A and 24C of frame 24, as well as a portion of side panel 24B which interconnects with both side panels 24A and 24B. Latch member 32 formed integral with side panel 24B and projecting thereabove is also shown in the Figure.

FIG. 6B is a cross-sectional view taken along line 6B—6B of FIG. 2. The cross-sectional view of FIG. 6B shows a cross section of side panel 24B, side panel 24D, and flange 76 formed integral with side panel 24D and extending therebeneath. Bore 84 extending through flange 76 is further illustrated in the cross-sectional view of FIG. 6B.

FIG. 7 is an overhead view of support arm 44 which forms a portion of carrier assembly 20. Support arm 44 is generally rectangular in dimension, and is, in the preferred embodiment, integrally formed of a thermoplastic material. Raised bottom surface 44A which forms a support surface is formed at a first end of support arm 44. Spaced-apart flanges 108 and 112, which are aligned with one another, are formed to extend beyond the surface of support arm 44. Flanges 108 and 112 are, in the preferred embodiment, integrally formed with support arm 44, and, hence, are comprised of the same thermoplastic material of which support arm 44 is comprised. Bores 116 and 120, shown in hatch, extend laterally through flanges 108 and 112, respectively. Flanges 108 and 112 are spaced apart by distances such that outer sidewalls of the respective flanges 108 and 112 are spaced-apart by a distance which is less than the distance separating the inner sidewalls of flanges 76 and 80 which extends beneath side panel 24D of frame 24.

Longitudinally-extending ramp members 124 and 128 are formed at opposite sides of a bottom surface of support arm 44, and, similar to flanges 112 and 116, extend beyond the surface of support arm 44. Ramp members 124 and 128 are also preferably integrally formed with the support arm, and are comprised of the same thermoplastic material of which support arm 44 is comprised.

FIG. 8 is a side, elevational view, taken from a first side of support arm 44. The side-elevational view of FIG. 8 illustrates in greater detail the relationship of ramp member 124 with flange 116. A top surface of ramp member 124 is comprised of several segments.

A first segment of the top surface, designated in the Figure by reference numeral 124A, forms a linear, ramped surface which projects at an angle relative to the surface of support arm 44.

A second segment of the surface of ramp member 124, designated in the Figure by reference numeral 124B, forms a semicircular, grooved surface. the grooved surface formed of segment 124B is aligned with flange 108, which is positioned, in the side-elevational view of FIG. 8, behind ramp member 124.

A third segment, designated in the Figure by reference numeral 124C, of the top surface of ramp member 124, similar to segment 124A, is a linear, ramped surface which extends at an angle relative to the bottom surface of support arm 44. A side surface of ramp 124 includes two detents, clip position detent 124D and table-support detent 124E. Although ramp member 128 is hidden from view in the side-elevational view of FIG. 8, ramp member 128 is identical in shape to that of ramp member 124, and may be similarly drawn. The raised bottom surface 44A formed at a first end of support arm 44 which forms a support surface is also again shown in the figure.

FIG. 9 is a cross-sectional view, in elevation, of support arm 44 taken along line 9—9 of FIG. 7. The cross-sectional view of FIG. 9 again illustrates the raised, bottom surface 44A forming a portion of support surface 44, ramp member 124 (comprised of segments 124A, 124B, 124C), detents 124D and 124E, and flange 108 having bore 116 extending therethrough.

Figure 10:
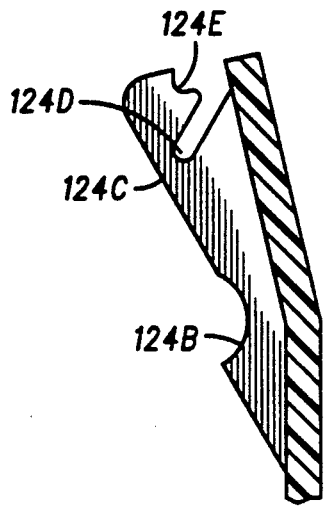
FIG. 10 is cutaway, elevational view of a portion of the support arm of FIG. 8.

FIG. 10 is a cutaway, elevational view, in isolation, of a portion of support surface 44 and ramp 124 formed integral therewith and extending therebeneath. Ramp member 124 is again shown to form a top surface thereof comprised of segments 124A, 124B, and 124C. Detents 124D and 124E at a front side portion of ramp member 124 are also shown.

Figure 11:
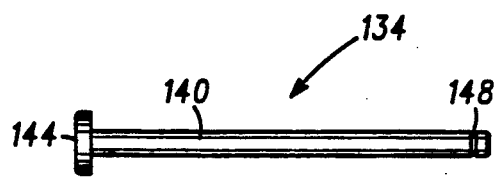
FIG. 11 is an enlarged, elevational view of a pivot shaft which forms a portion of the carrier assembly of the preferred embodiment of the present invention.

FIG. 11 is an enlarged, elevational view of pivot shaft 134. Pivot shaft 134 forms a portion of carrier assembly 20 of the preferred embodiment of the present invention, and is operative to couple pivotally support arm 44 to frame 24. Pivot shaft 134 is formed of a longitudinally-extending shaft portion 140 and a head portion 144 formed at an end portion thereof. Shaft portion 140 of pivot shaft 134 is of a diameter permitting insertion of the shaft portion 140 through bores 84 and 88 of flanges 76 and 80 and through bores 116 and 120 of flanges 108 and 112. Pivot shaft 134, when inserted through bores 84–88 and 116–120, supports support arm 44 in pivotal engagement with frame 24, and is operative to pivotally couple support arm 44 to side panel 24D of frame 24 to permit pivotal movement of the support arm thereabout. Pivot shaft 134 is further shown to include neck portion 148 of reduced diametrical dimensions at an end of a pivot shaft 134 opposite that of head portion 144. Neck portion 148 is operative to receive a conventional retaining clasp member thereat to maintain the pivot shaft 134 in position when assembled to couple pivotally support arm 44 to frame 24.

Figure 12:
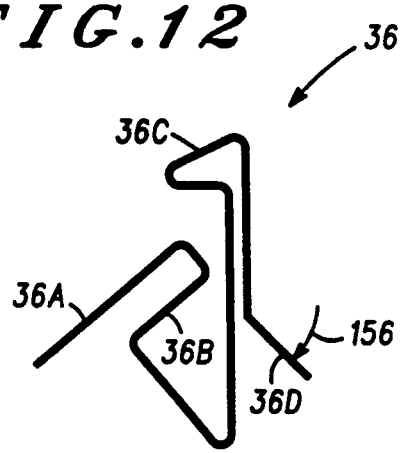
FIG. 12 is an elevational view, in isolation, of a latch member forming a portion of the carrier assembly of the preferred embodiment of the present invention.

FIG. 12 is an enlarged, side-elevational view of latch member 36 shown previously in the perspective view of FIG. 1. Latch member 36, in the preferred embodiment, is comprised of a flexible, metallic or other bendable, material. A first side of latch member 36 is bent into a U-shaped configuration which forms a U-shaped portion of the latch member thereby. Opposing legs, here identified by reference numerals 36A and 36B, of the U-shaped portion of latch member 36 are spaced-apart by a distance corresponding to the depth of side panel 24D at recessed area 66 of the side panel. Legs 36A and 36B are positioned in a confronting relationship with top and bottom surfaces, respectively, of side panel 24D of frame 24 and affix thereby the latch member to the side panel.

While not shown in the side, elevational view of FIG. 12, a face surface of leg 36A includes an aperture permitting mated engagement with raised button 60 formed on a top surface of side panel 24D. By aligning legs 36A and 36B with recessed area 66 formed upon a top surface of side panel 24D, and leg 36B between tracks 92 and 96 formed upon a bottom surface of side panel 24D, and then sliding the latch member to position legs 36A and 36B in the confronting relationship upon the face surfaces of side panel 24D, latch member 36 may be affixed in position thereupon.

A second portion of latch member 36, designated here by reference numeral 36C is bent to form a bight section. Bight section 36C forms latching surfaces along side surfaces thereof to permit mated engagement with corresponding latching surfaces formed upon an electronic device to permit latching engagement therebetween. An end portion of latch member 36, here designated by reference numeral 36D, is bent at an angle to form a force receiving surface to receive a force received in a direction indicated by arrow 156. Application of a force in a direction indicated by arrow 156 causes deflection of bight section 36C of latch member 36. Pivotal movement of bight section 36C causes the latching surfaces formed thereupon to be removed from latching engagement with corresponding latching surfaces formed upon an electronic device.

Figure 13:
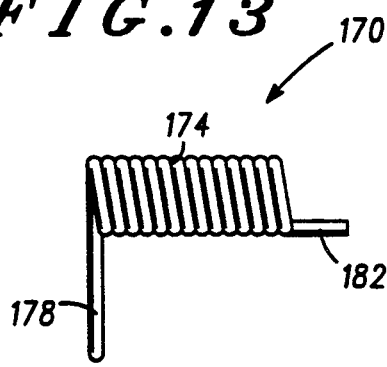
FIG. 13 is an elevational view, in isolation, of a torsion spring forming a portion of the carrier assembly of the preferred embodiment of the present invention.

FIG. 13 is a side, elevational view, in isolation, of spring member 170, forming a portion of carrier assembly 20 of a preferred embodiment of the present invention. As illustrated, spring member 170 is preferably formed of a torsion spring formed of a central coil section 174 and first and second spring sides 178 and 182. A central cavity (not shown in FIG. 13) defined by central coil section 174 is of a diameter permitting positioning of spring member 170 about the shaft portion 140 of pivot shaft 134, shown in FIG. 11. When suitably positioned about shaft portion 140 of pivot shaft 134, and when pivot shaft 134 is positioned to pivotally couple support arm 44 by insertion through bores extending through flanges 76–80 and 108–112, first side 178 of spring 170 seats against a bottom surface of side panel 24D, and second side 182 of spring 170 seats against a side surface of flange 112 of support arm 44. Spring 170 generates a spring force to cause pivotal movement of the support arm 44 about pivot shaft 134 thereby.

Figure 14:
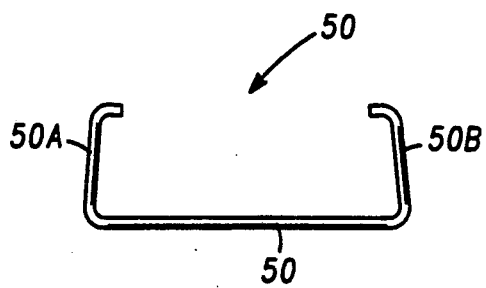
FIG. 14 is an elevational view, in isolation, of a stay forming a portion of the carrier assembly of the preferred embodiment of the present invention.

Turning next to the side, elevational view of FIG. 14, stay 50 forming a portion of carrier assembly 20 of the preferred embodiment of the present invention is illustrated. As mentioned briefly hereinabove, stay 50 is formed of a rod member having bent-angled end portions, here designated by reference numerals 50A and 50B. End portions 50A and 50B of stay 50 seat in apertures formed in side surfaces of flanges 76 and 80 which extends beneath side panel 24D.

When suitably seated in the apertures formed in the flanges 76 and 80, stay 50 is permitted limited pivotal movement thereabout. The rod member of which stay 50 is comprised is of diametrical dimensions permitting the rod member to be received at clip position detent and table-support position detent 124D and 124E, respectively, of ramps 124 and 128. The spring force generated by spring 170 when suitably supportively engaged about pivot shaft 130 causes pivotal movement of the support arm 44 until stay 50 is received at, and is seated in, clip detent 124D.

Application of a force contrary to the spring force generated by spring 170 causes pivotal movement of the support arm to cause release of stay 50 from its seating engagement at clip detent 124D, and then to reposition stay 50 at the table-support detent 124E. As clip detent 124D and table-support detent 124E are of differing dimensions, seating of stay 50 at the respective ones of the detents 124D-124E causes the orientation of support arm 44 relative to frame 24 to differ. Stay 50 is operative thereby to maintain support arm in a desired orientation relative to the frame 24.

Figure 15:
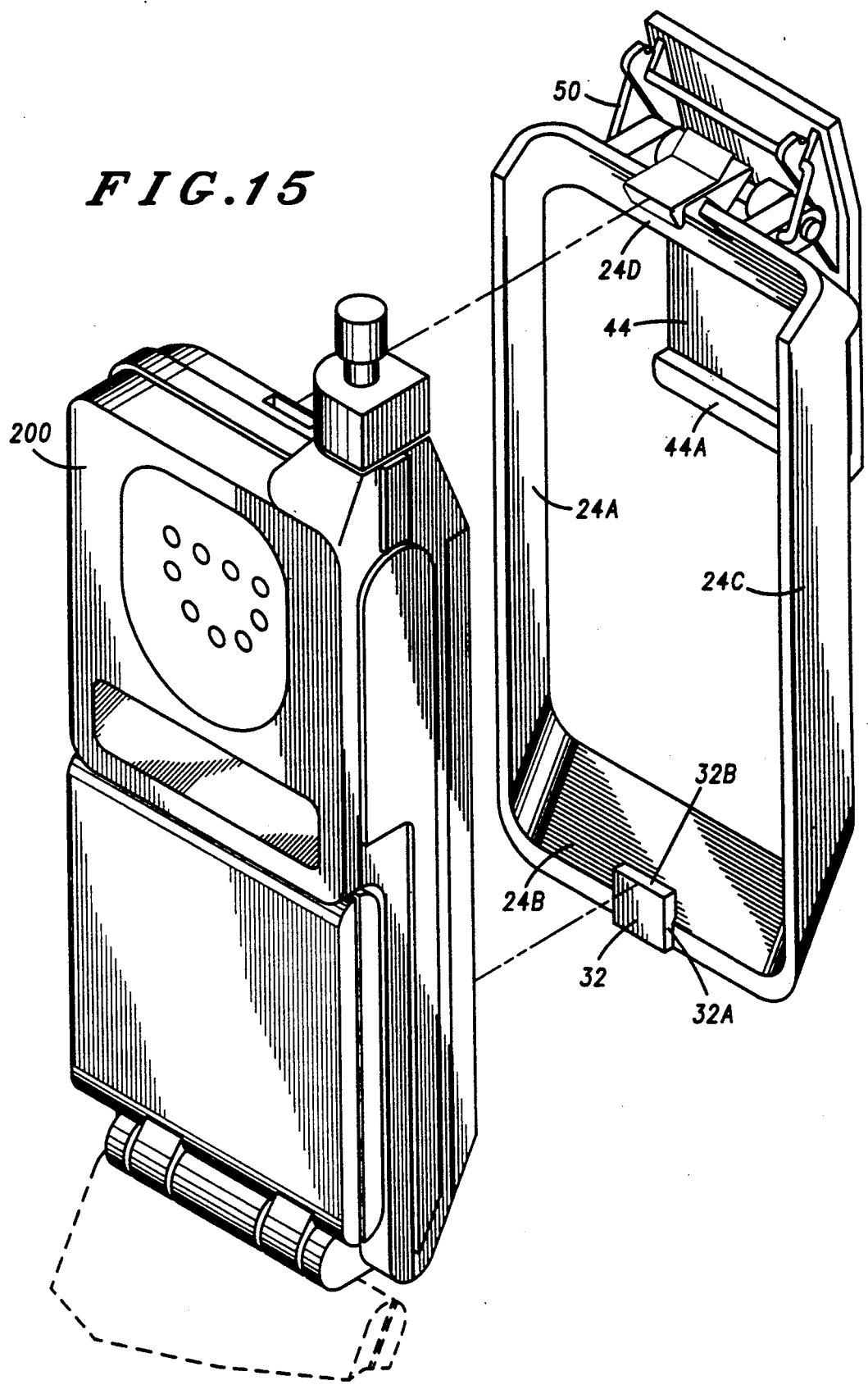
FIG. 15 is an exploded, perspective view of the carrier assembly of FIG. 1 and a radiotelephone positioned thereabove.

Turning now to the exploded, perspective view of FIG. 15, carrier assembly 20 is positioned to receive radiotelephone 200 thereat. While carrier assembly 20 is illustrated in the figure as receiving a cellular, radiotelephone, such as the Motorola Micro T.A.C. 950 (tm), it is to be understood that carrier assembly 20 may be similarly adapted to receive other electronic devices such as a cordless telephone handset. Frame 24 is here of dimensions such that an inner diameter defined by the side panels 24A-D is of dimensions corresponding to, but slightly greater than, the dimensions of radiotelephone 200 so that telephone 200 may be received by assembly 20 to rest on seating surfaces formed upon side panels 24B and 24D thereof. Latch member 32 and latch member 36, each formed integral with, or affixed to frame 24 are positioned to matedly engage with corresponding latching surfaces formed upon radiotelephone 200 when received in supportive engagement upon carrier assembly 20. By merely lowering of radiotelephone 200 into position to supportively engage radiotelephone 200 at the support surface formed upon side panels 24B and 24D, and latching radiotelephone 200 to frame 24 by way of latch members 32 and 36, radiotelephone 200 becomes affixed to the frame 24.

Figure 16:
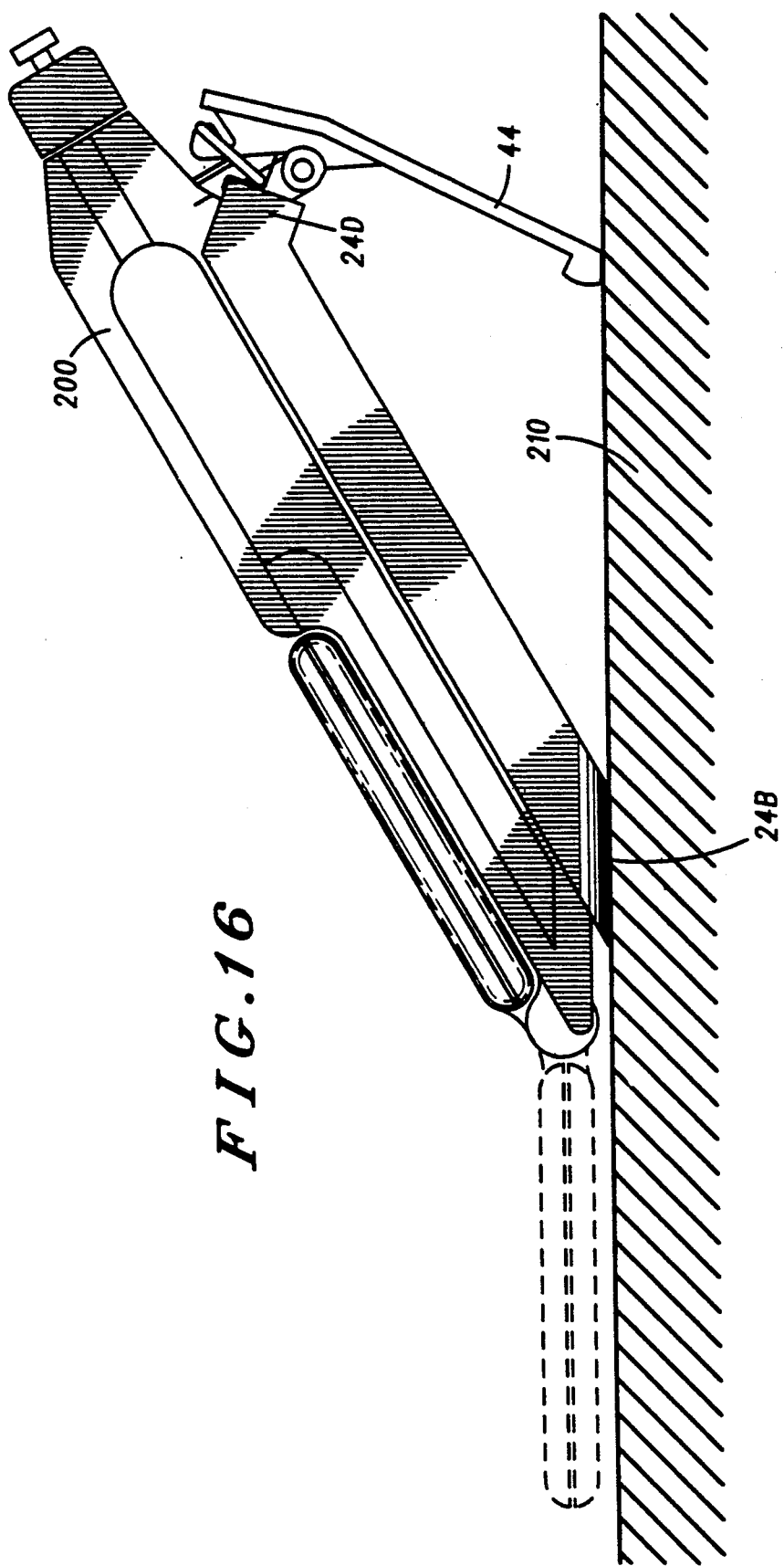
FIG. 16 is a side, elevational view of the support apparatus of the preceding figures affixed to a radiotelephone, and positioned upon a table-top surface in a table-support position.

FIG. 16 is a side, elevational view of carrier assembly 20 in which radiotelephone 200 is positioned in supportive engagement upon the support surfaces formed of side panels 24B and 24D. Support arm 44 is rotated into a table-support position whereat stay 50 is received and seated against table-support detents 124E formed upon ramp members 124 and 128, respectively. When support arm 44 is rotated and maintained at the table-support position, as shown, bottom portion 44A of the support arm 44 forms a support surface forming a support to support the radiotelephone 200 affixed to frame 24 in a desired orientation relative to a surface, here table-top surface 210. The angle at which visual indicia and displays disposed upon radiotelephone 200 relative to a user of the radiotelephone is thereby adjusted to permit a most-advantageous orientation for a user to view the visual indicia of the radiotelephone.

Figure 17:
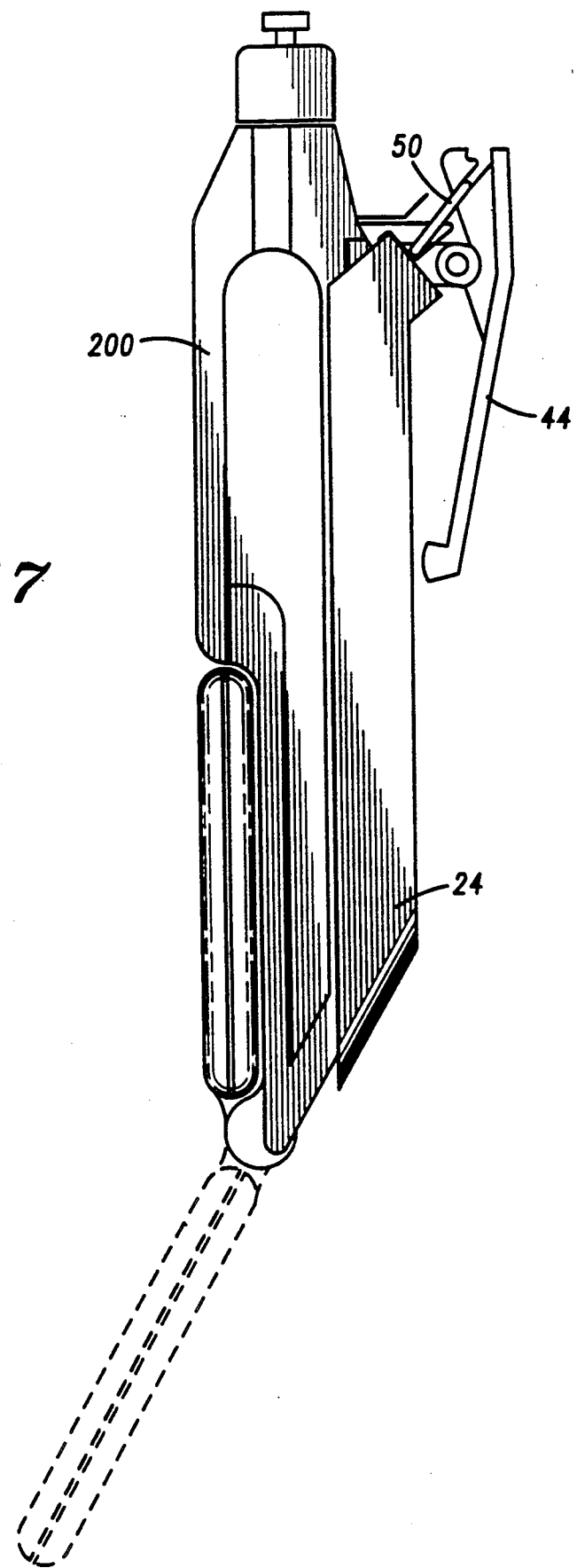
FIG. 17 is a side, elevational view of the carrier assembly of the preceding figures affixed to the radiotelephone and positioned in a clip position.

Turning finally now to the side, elevational view of FIG. 17, radiotelephone 200 is shown once again affixed in position to frame 24 of carrier assembly 20. FIG. 17, however, illustrates positioning of the support arm at the clip-position whereat stay 50 is received by, and seated against, clip-detent 124D. In such an orientation, support arm 44 is operative to form a clip permitting clipping of the carrier assembly 20, and radiotelephone 200 affixed thereto, to an object, such as a belt. When radiotelephone 200 is supported in position by positioning of the support arm in the clipped position about a belt, the radiotelephone 200 is carried automatically as a user moves about. By application of a force upon support arm 44 to cause pivotal movement thereof, frame 24 may be removed from its supportive engagement with the external object. Support arm 44 may then be positioned at the table-support position, and the radiotelephone 200 may be supported in a desired orientation upon a flat surface, such as previously shown in FIG. 16, upon a table-top.

As carrier assembly 20 is operative to form both a clip and also as a table-support structure, the single apparatus is thereby operative to perform two separate functions.

While the present invention has been described in connection with the preferred embodiments shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A support apparatus for a telephonic handset having an elongated face surface and latching surfaces formed at opposing ends of the elongated face surface, said support apparatus comprising:

means for bracketing formed of first and second, longitudinally-extending panels and first and second, transversely-extending panels connected theretogether to form a rectangular-shaped frame defining a perimeter of dimensions corresponding to, but slightly greater than, dimensions of the elongated face surface of the telephonic handset, wherein surfaces of the transversely-extending panels are oriented to form seating surfaces for receiving the face surface of the telephonic handset in supportive engagement thereagainst;

a first latch having a first side thereof fixedly connected to a first of the transversely-extending panels of the frame formed of said means for bracketing and a second side thereof for generating a latching force for latching against the latching surface formed at the top end of the elongated face surface of the telephonic handset;

a second latch integrally formed with a second of the transversely-extending panels of the frame formed of the means for bracketing for latching against the latching surface formed at the bottom end of the elongated face surface of the telephonic handset;

means forming a support arm pivotally coupled to the first of the transversely-extending panels of the frame and having pivotal movement between a clip position and a table-support position;

means forming a spring for generating a bias force for maintaining the support arm normally in the clip position; and means forming a stay for maintaining the support arm at the table-support position subsequent to the pivotal movement of the support arm into the table-support position.

2. The support apparatus of claim 1 wherein the longitudinall-extending and transversely-extending panels comprising the frame are integrally-formed and comprised of a thermoplastic material.

3. The support apparatus of claim 1 further comprising a pivot shaft coupled to the first of the transversely-extending panels of the frame and to the support arm, said pivot shaft for permitting the pivotal movement of the support arm thereabout to position the support arm in either the clip position or the table support position.

4. The support apparatus of claim 3 wherein the first of the transversely-extending panels of the frame further comprises spaced-apart, downwardly-extending flanges formed integral therewith and extending therebeneath, said flanges for supporting the pivot shaft therebetween.

5. The support apparatus of claim 3 wherein the spring formed by said means for generating the bias force comprises a torsion spring.

6. The support apparatus of claim 5 wherein the torsion spring is supported in position about the pivot shaft.

7. The support apparatus of claim 4 wherein said support arm further comprises a clip position detent and a table-support position detent, each of the detents, respectively, for receiving said stay thereat when the support arm is positioned at the clip position and at the detent position, respectively.

8. The support apparatus of claim 7 wherein the pivotal movement of the support arm is prevented when the stay is received at the table-support position to maintain thereby the support arm at the table support position.

9. The support apparatus of claim 8 wherein the stay is comprised of a rod member having bent-angled end portions engaged with the downwardly-extending flanges formed integral with the first of the transversely-extending panels of the frame and permitting rotational movement of the rod member to position the rod member at either the clip detent or the table-support detent.

10. The support apparatus of claim 7 wherein the support arm further comprises a support surface formed at an end portion thereof.

11. The support apparatus of claim 1 wherein the support arm extends at an angle relative to a plane defined by the frame when the support arm is positioned at the table-support position.

12. The support apparatus of claim 1 wherein an end portion of the support arm is positioned to abut against the elongated face surface of the telephonic handset when the support arm is positioned at the clip position.

13. A telephonic carrier assembly for carrying a portable radio telephone having an elongated face surface therewith, said carrier assembly comprising:
a frame having first and second longitudinally-extending panels and first and second transversely-extending panels integrally formed of a thermoplastic material and connected theretogether at end portions thereof to define a rectangular perimeter corresponding to, but slightly greater than, dimensions of the elongated face surface of the radio telephone to permit positioning of the radio telephone thereon, wherein surfaces of the transversely-extending panels are oriented to form seating surfaces for receiving the face surface of the radio telephone thereupon;
a first latch having a first side thereof fixedly connected to a first of the transversely-extending panels of the frame and having a second side thereof for generating a latching force for latching the radio telephone to the frame;
a second latch integrally formed with a second of the transversely-extending panels of the frame and forming a latching surface for latching with a corresponding latching surface formed upon the radio telephone in mated engagement therewith;
a pair of spaced-apart, downwardly-extending flanges formed integral with the frame and extending therebeneath;
a pivot shaft mounted to each flange of the pair of downwardly-extending flanges and positioned to extend therebetween;
a support arm pivotally coupled to the pivot shaft and having pivotal movement thereabout between a clip position and a table-support position, said support arm having a clip portion detent and a table-support position detent integrally formed therewith;
a stay formed of a rod member having bent-angled end portions coupled at the end portions thereof to the pair of spaced-apart, downwardly extending flanges, said stay limiting the pivotal movement to be received at either the clip position detent or the table-support position detent; and
a torsion spring supported about the pivot shaft for generating a bias force for maintaining the support arm normally in the clip position.

14. In a portable radio telephone assembly having a housing including an elongated face surface and latching surfaces formed at opposing ends of the elongated face surface and transceiver circuitry housed within the housing, a combination with the housing of:
means for bracketing formed of first and second, longitudinally-extending panels and first and second, transversely-extending panels connected theretogether to form a rectangular-shaped frame defining a perimeter of dimensions corresponding to, but slightly greater than, dimensions of the elongated face surface of the telephonic handset, wherein surfaces of the transversely-extending panels are oriented to form seating surfaces for receiving the face surface of the telephonic handset in supportive engagement thereagainst;
a first latch having a first side thereof fixedly connected to a first of the transversely-extending panels of the frame formed of said means for bracketing and a second side thereof for generating a latching force for latching against the latching surface formed at a top end of the elongated face surface of the telephonic handset;
a second latch integrally formed with a second of the transversely-extending panels of the frame formed of the means for bracketing for latching against the latching surface formed at a bottom end of the elongated face surface of the telephonic handset;
means forming a support arm pivotally coupled to the first of the transversely-extending panels of the frame and having pivotal movement between a clip position and a table-support position;
means forming a spring for generating a bias force for maintaining the support arm normally in the clip position; and
means forming a stay for maintaining the support arm at the table-support position subsequent to the pivotal movement of the support arm into the table-support position.

* * * * *